United States Patent
Triaca et al.

(10) Patent No.: US 10,175,079 B2
(45) Date of Patent: Jan. 8, 2019

(54) ENCODER DEVICE AND FLUID METER COMPRISED THEREOF

(71) Applicant: Dresser, Inc., Addison, TX (US)

(72) Inventors: Giuseppe Triaca, Talamona (IT); Gary Martin Lawlor, Talamona (IT); Franco Morosini, Talamona (IT)

(73) Assignee: Dresser, LLC, Addison, TX (US)

( * ) Notice: Subject to any disclaimer, the term of this patent is extended or adjusted under 35 U.S.C. 154(b) by 0 days.

(21) Appl. No.: 14/646,829

(22) PCT Filed: Jun. 6, 2014

(86) PCT No.: PCT/US2014/041372
§ 371 (c)(1),
(2) Date: May 22, 2015

(87) PCT Pub. No.: WO2015/187182
PCT Pub. Date: Dec. 10, 2015

(65) Prior Publication Data
US 2017/0074702 A1    Mar. 16, 2017

(51) Int. Cl.
*G01F 3/22* (2006.01)
*G01F 15/14* (2006.01)

(52) U.S. Cl.
CPC .............. *G01F 3/226* (2013.01); *G01F 15/14* (2013.01)

(58) Field of Classification Search
None
See application file for complete search history.

(56) References Cited

U.S. PATENT DOCUMENTS

| | | | | |
|---|---|---|---|---|
| 3,751,642 A | * | 8/1973 | Todd | B67D 7/228 222/23 |
| 5,325,715 A | * | 7/1994 | Foran, Jr. | G01F 3/10 73/261 |
| 5,816,246 A | * | 10/1998 | Mirza | A61B 5/09 600/539 |
| 5,902,938 A | * | 5/1999 | Beaudoin | G01F 1/065 73/861.77 |

(Continued)

FOREIGN PATENT DOCUMENTS

| EP | 2080999 A1 | 7/2009 |
|---|---|---|
| EP | 2249133 A1 | 11/2010 |
| WO | 2013150430 A1 | 10/2013 |

OTHER PUBLICATIONS

International Search Report and Written Opinion issued in connection with corresponding PCT Application No. PCT/US2014/041372 dated Feb. 26, 2015.

*Primary Examiner* — Harshad R Patel
(74) *Attorney, Agent, or Firm* — Paul Frank + Collins P.C.

(57) ABSTRACT

An encoder device and a fluid meter incorporating the encoder device is disclosed herein, wherein the fluid meter can embody a gas meter that monitors supply of gas to a consumer. The encoder device is configured to generate a signal with information that quantifies the supply of gas, for example, by associating the movement of a moveable element with a volume of fluid that flows through the gas meter. The gas meter can include a metrological part with a housing that forms an interior space that wholly encloses the encoder device therein and can also be configured with an input/output member that conducts the signal from inside of the interior space to outside of the housing.

18 Claims, 6 Drawing Sheets

(56) References Cited

U.S. PATENT DOCUMENTS

| | | | | |
|---|---|---|---|---|
| 7,212,953 B1* | 5/2007 | Artiuch | .................... | G01F 1/05 |
| | | | | 702/100 |
| 7,295,934 B2* | 11/2007 | Hairston | ............. | G01F 25/0053 |
| | | | | 702/140 |
| 8,639,464 B2* | 1/2014 | Artiuch | ............... | G01F 25/0007 |
| | | | | 702/100 |
| 8,757,009 B2* | 6/2014 | Jennings | ................. | B67D 7/04 |
| | | | | 700/244 |
| 2005/0000302 A1* | 1/2005 | Winter | .................... | G01D 5/28 |
| | | | | 73/861.77 |
| 2009/0035121 A1* | 2/2009 | Watson | ................... | F01C 1/126 |
| | | | | 415/1 |
| 2012/0150344 A1* | 6/2012 | Jennings | ................. | B67D 7/04 |
| | | | | 700/244 |
| 2013/0110286 A1* | 5/2013 | Williams | ................ | G06F 17/00 |
| | | | | 700/244 |
| 2015/0135851 A1* | 5/2015 | Lauber | .................... | G01F 1/075 |
| | | | | 73/861.77 |
| 2017/0167903 A1* | 6/2017 | Schneider | ............. | B01L 3/5027 |
| 2018/0001011 A1* | 1/2018 | Meyer | ................. | A61M 1/1601 |

* cited by examiner

ENCODER DEVICE AND FLUID METER COMPRISED THEREOF

BACKGROUND

The subject matter disclosed herein relates to flow meters and fluid metering technology with particular discussion about embodiments of an encoder device for use on gas meters, wherein one or more of the embodiments have particular utility to generate information that relates to flow of fluids through the gas meter.

Gas meters are a special type of flow meter that are configured to measure a volume of fluid. Utilities often employ gas meters to monitor supply of fuel gas (e.g., natural gas, propane, etc.) for various applications including applications that measure supply of gas to residential, commercial, and industrial consumers. In conventional designs, gas meters incorporate mechanical components that move in response to flow of the gas through one or more chambers of fixed size. Diaphragm-style gas meters, for example, use a diaphragm (or bellows) that continuously reciprocates in response to flow of the gas. The diaphragm actuates a mechanical linkage that translates the reciprocating motion to other movement (e.g., rotation) to turn dials and/or like indicators that provide visual indication (and/or quantification) of gas the consumer uses over time. Use of this mechanical structure in the design to measure the supply accounts for changes in properties of gases, which are particularly sensitive to deviations in temperature, pressure, and like operating conditions.

In addition to the functional constraints of gases, regulations can also influence the design and operation of gas meters. For example, certain regulations may require gas meters to have separate compartments, one each to keep the diaphragm(s) and related measurement structure (also "metrology" structure) separate from the dials (or "application" structure). Other regulations may specify that the metrology structure must operate independent from other parts of the gas meter, e.g., the application structure. More often, regulations also dictate that the compartment for the metrology structure must remain free from leaks of supply gas.

These requirements can add significant complexity to the design of the gas meter. Use of the mechanical structure, while offering accurate and repeatable measurement of supply, can allow supply gas to leak from the compartments because the mechanical linkage, which couples the metrology structure with the application structure, must extend across both of the compartments to properly convey the measured supply of gas to the dials. On the other hand, requirements for independent operation of the metrology structure can pre-empt designs that use the application structure or a unitary housing to seal the gas meter.

BRIEF DESCRIPTION OF THE INVENTION

This disclosure describes improvements in flow meters that, at least, address these problems and complications in design of gas meters. As set forth more below, the embodiments herein describe an encoder device that resides wholly within the metrology structure. The embodiments are configured to interface with the diaphragm (and/or related measurement structure) to provide a measure of supply of gas. During operation, the embodiments can generate an output, generally an electrical signal that includes information that relates to the measure. In addition to measurements, the embodiments can be configured to process signals, to record (or store) information, and to exchange information (e.g., in the form of executable and/or machine readable instructions) that can instruct as to the operation of the encoder device, the metrology structure and/or the application structure, and the gas meter, generally.

The embodiments of the encoder device eliminate the need to convey mechanical movement across the compartments. This feature can resolve problems in conventional designs that must convey mechanical movement through the metrology structure. On the other hand, use of encoder device, alone or in combination with one or more other elements, effectively eliminates the need for the linkage on the gas meter in lieu of an input/output (e.g., a connector) that can conduct the output from the encoder device to the application structure without any moving parts. Examples of the connector may have no moving parts, which adapts the input/output more readily to seal the metrology structure. This seal can avoid leaks or, at least, reduce the likelihood that gas can escape from the metrology structure from the area around the input/output.

Embodiments of the encoder device can also mount wholly within the metrology structure. When used with the input/output, discussed above, this feature can also avoid potential leaks from the metrology structure. Moreover, configuring the encoder with enhanced processing, storage, and like functionality enables the metrology structure to operate autonomously (i.e., without the application structure), when coupled to received power from a power source, to measure supply gas, as well as to perform other functions contemplated herein. This added functionality can allow the metrology structure to couple with bench test and calibration device to undergo calibration and preparation for delivery without the application structure. At time of delivery of the gas meter, the application part can attach to the metrology part to complete the gas meter. The availability of the metrology structure in inventory can, thus, reduce lead time for shipment and installation at the location of the consumer.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated. For purposes of the discussion that follows below, like numerals are used to identify like components except that the numerals are increased by 100 (e.g., 100 in FIG. 1 is 200 in FIG. 2).

DETAILED DESCRIPTION

Figure 1:
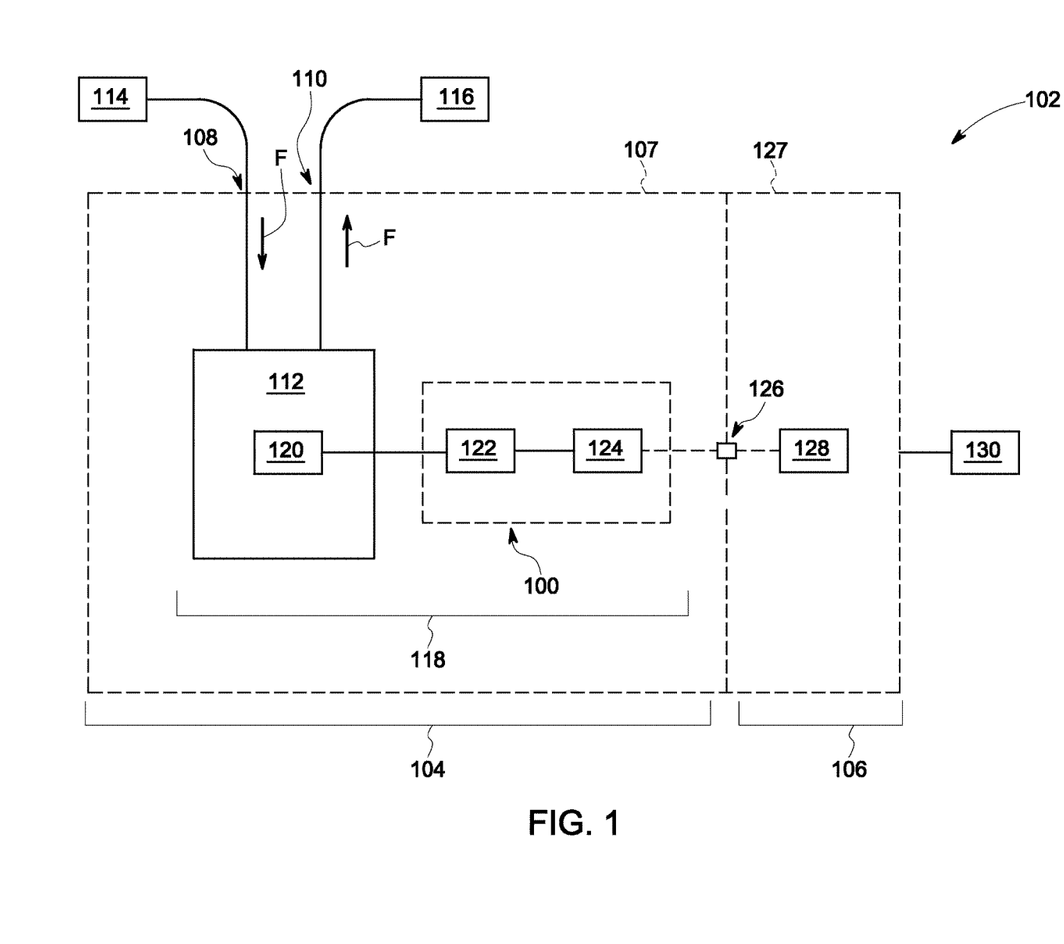
FIG. 1 depicts a schematic diagram of an exemplary embodiment of an encoder device.

FIG. 1 illustrates a schematic diagram of an exemplary embodiment of an encoder device 100. This embodiment is part of a fluid meter 102 that is configured with a metrological part 104 and an application part 106. The metrological part 104 has a first housing 107 with one or more ports (e.g., a first port 108 and a second port 110) that couple with a metering device 112. The ports 108, 110 may embody an inlet and outlet that couple with, respectively, a fluid source 114 and a consumer 116. This configuration allows a fluid F (e.g., natural gas) from the fluid source 114, often a municipal and/or industrial gas supply, to enter and exit the metering device 112 before the fluid F reaches the consumer 116. As also shown in FIG. 1, the encoder device 100 can be part of a monitoring system 118 that is configured to measure the supply of fluid F to the consumer 116. The monitoring system 118 can include a fluid meter member 120, an interface member 122, and a processing member 124. The monitoring system 118 couples with an input/output member 126 that is configured to allow for the exchange of power and information between the encoder device 100 and components outside of the first housing 107. In one embodiment, the application part 106 has a second housing 127 that couples with the first housing 107. The second housing 127 can be configured to enclose a display member 128 and/or other components of the application part 106 that relate to gas meter technology. The input/output member 126 can couple with the display member 128 and/or these other components, as well as with a device 130 remote from the fluid meter 102 (also, "remote device 130").

During operation, demand for fluid F downstream of the fluid meter 102 generates a flow of fluid F through the fluid meter member 120. The flow can stimulate movement of a diaphragm or bellows (or other moveable elements) in the fluid meter member 120. This movement generates a first output, often in the form of mechanical movement (e.g., rotation) of an element that couples with the moveable element. The first output corresponds to a fixed volume of fluid F in the fluid meter member 120. The interface member 122 can convert the first output to a first signal (e.g., an electrical signal) with properties (e.g., voltage, current, frequency, etc.) that reflect the relationship between the mechanical movement of the moveable element and the volume of fluid F that flows through the fluid meter member 120. In one embodiment, the processing member 124 can receive the first signal and, as noted herein, process the first signal to generate a second signal that measures and/or quantifies the supply of gas as for use, e.g., on the display member 128 via the input/output member 126.

The input/output member 126 can facilitate the exchange of power and information between the encoder device 100 and another device (e.g., application part 106, remote device 130, etc.). This information many reflect the measured supply of gas. In other examples, the information may be configured as executable (or machine readable) instructions that transit to and from the encoder device 100. Devices for use as the input/output member 126 can include connectors having a first connective end disposed in the metrological part 104 and a second connective end disposed in the application part 106. These connectors can have a structure that include elements (e.g., pins, wires, etc.) that can conduct signals; for example, this disclosure contemplates use of the connector with structures that comport with various data transfer protocols (e.g., universal serial bus (USB), RS-232, Firewire®, etc.). In one embodiment, a first cable can connect the encoder device 100 to the first connective end of connector to allow information to transit to the connector, which in turn can conduct the signal from the first connective end to the second connective end. In use, a second cable can connect to the second connective end, thus enabling the signal to conduct, e.g., to the display 128 and/or the remote device 130. This configuration is effective to allow the encoder device 100 to exchange information. Also, the configuration provides power to the encoder device 100 via the cabling (e.g., the first cable and the second cable), which avoids the need for a power supply internal to the metrological structure 104 and, thus, exposed to potentially dangerous gas environment found therein.

Implementation of the connector, or input/output member 126 generally, can conduct power to the encoder device 100 as well as allow an end user to interact with the encoder device 100 to exchange information and data. During operation, for example, the end user can couple a computing device (e.g., laptop, desktop, cell phone, smartphone, tablet, etc.) to download and upload information to and from the encoder device 100. This feature allows the end user to update software and firmware. The end user can also access information and data that the encoder device 100 stores locally, e.g., on memory. In certain configurations, the application part 106 may include one or more antenna and/or like wireless device(s), wherein the application part 106 is configured to format a signal in accordance with one or more wireless protocols to wirelessly transmit the signal, e.g., to remote device 130 (FIG. 1). This wireless functionality can configure the application part 106 to connect with one or more network systems that allow the application part 106, and/or the encoder device 100, to exchange information with cloud-based services and/or remote server.

The interface member 122 can convert mechanical movement to signals for use by one or more components of the encoder device 100. In practice, the interface member 122 can leverage various techniques to engage with the moveable elements on the fluid metering member 120. These techniques may use gears, linkages, and like mechanical components in combination with electrical components (e.g., sensors), as desired. As shown in FIG. 1, the encoder device 100 may incorporate the interface member 122, packaging the interface member 122 along with other components into a unitary structure (also "unitary package") that can fit within the first housing 107 of the metrological part 104.

Figure 2:
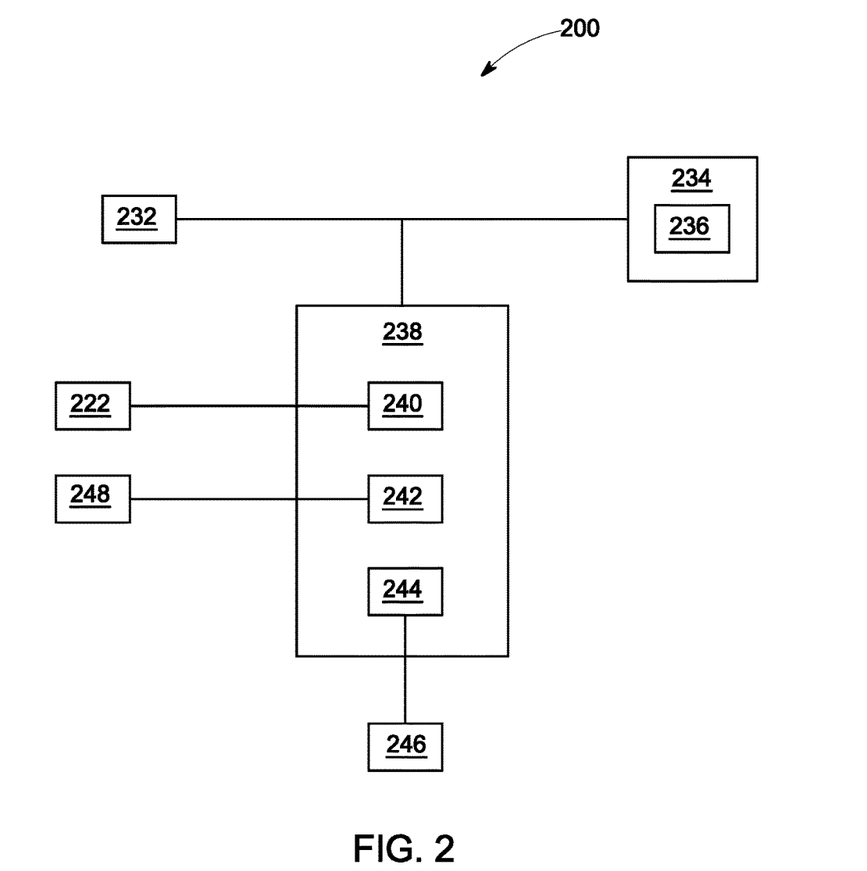
FIG. 2 depicts a diagram of a wiring schematic for an exemplary embodiment of an encoder device.

FIG. 2 depicts a diagram that illustrates, at a high level, a wiring schematic for an exemplary embodiment of an encoder device 200. This embodiment includes a processor 232 with access to memory 234, shown here on-board the encoder device 200. The memory 234 may include one or more executable instructions 236 in the form of software, firmware, and like machine readable instructions configured to be executed by the processor 232. In one example, the encoder device 200 may utilize control circuitry 238 with various drive circuitry (e.g., an interface drive circuitry 240, a sensor drive circuitry 242, and an input/output drive circuitry 244). The interface drive circuitry 240 can couple with the interface member 222 to exchange signals (e.g., the signal above) with various information including information that reflects the measure of fluid flow, or supply, through the fluid meter member (e.g., fluid meter member 120 of FIG. 1). The sensor drive circuitry 242 can couple with a sensor member 248 that is sensitive to one or more operating conditions (e.g., temperature, pressure, relative humidity, etc.). In one example, the encoder device 200 can include an input/output 246, which couples here with the input/output drive circuitry 244. Examples of the input/output 246 can include connectors, antenna (e.g., wireless antenna), and like devices (e.g., pins, terminals, etc.) that conduct (and/or transmit) signals. These devices can facilitate the exchange of information between the encoder device 200 and, for example, the input/output member 126 (FIG. 1).

At a high level, construction of the encoder device 200 configure, at least, the metrological part 104 (FIG. 1) (and the fluid meter 102 (FIG. 1) generally) with functionality to execute extensive data processing and data storage not found on conventional gas meters. For certain functions, the encoder device 200 can be configured to generate data that reflects the count (or measure) of the supply gas that flows through fluid meter member 120 (FIG. 1). For other functions, the encoder device 200 can be configured to perform operations on this data. These operations may provide a total count of supply gas, as well as to offer more granulated data about the performance of the gas meter. The operations can also use and/or incorporate data, e.g., from a signal received from the sensor member 248, to provide information that reflects the influence of outside factors and environmental conditions (e.g., temperature) on the operation of the gas meter. Unlike conventional gas meters, these functions can compensate for changes in gas properties (e.g., volume) that occur to changes in temperature and other environmental conditions.

This functionality enhances the metrological part 104 (FIG. 1) to ease manufacture, assembly, and qualification of the fluid meter 102 (FIG. 1). As noted above, the encoder device 200 configures the metrological part 104 (FIG. 1) to operate independent from the application part 106 (FIG. 1). This feature allows the metrological part 104 (FIG. 1) to undergo calibration and qualification before the unit, as a whole, is distributed for use in the field. The autonomy of the metrological part 104 (FIG. 1) permits manufacture of the application part 106 (FIG. 1) with custom features and/or configurations, as desired, separate from the more standard standardized metrological part 104 (FIG. 1). At time of assembly of the fluid meter 102 (FIG. 1), the metrological part 104 (FIG. 1) and the application part 106 (FIG. 1) can secure with one another, coupling any dials, gauges, and like components with the encoder 200 via the input/input output member 126 (FIG. 1). In one implementation, executable instruction can be uploaded to the encoder device 200 to configure the metrological part 104 (FIG. 1) to work properly with the application part 106 (FIG. 1) for delivery and installation to the consumer.

These configurations also lend themselves to manufacture of the encoder device 200 using various semiconductor and/or circuit board technologies. In some embodiments, the encoder device 200 can include a substrate (e.g., a printed circuit board) and varieties of discrete elements (e.g., transistors, resistors, etc.) disposed thereon. The processor 232 can embody one or more processor devices (e.g., microprocessors, ASIC devices, etc.). These processor devices can be configured to execute the executable instructions 236 to configure the encoder device 200 for the various functions contemplated therein. The processor 232 can interact with memory 234, either directly or via some control circuitry, both to access the executable instructions as well as to store data and information on memory 234. Devices for use as memory 234 can include RAM and ROM; however this disclosure does not foreclose use of any medium that is configured to store and retain data and information.

Figure 3:
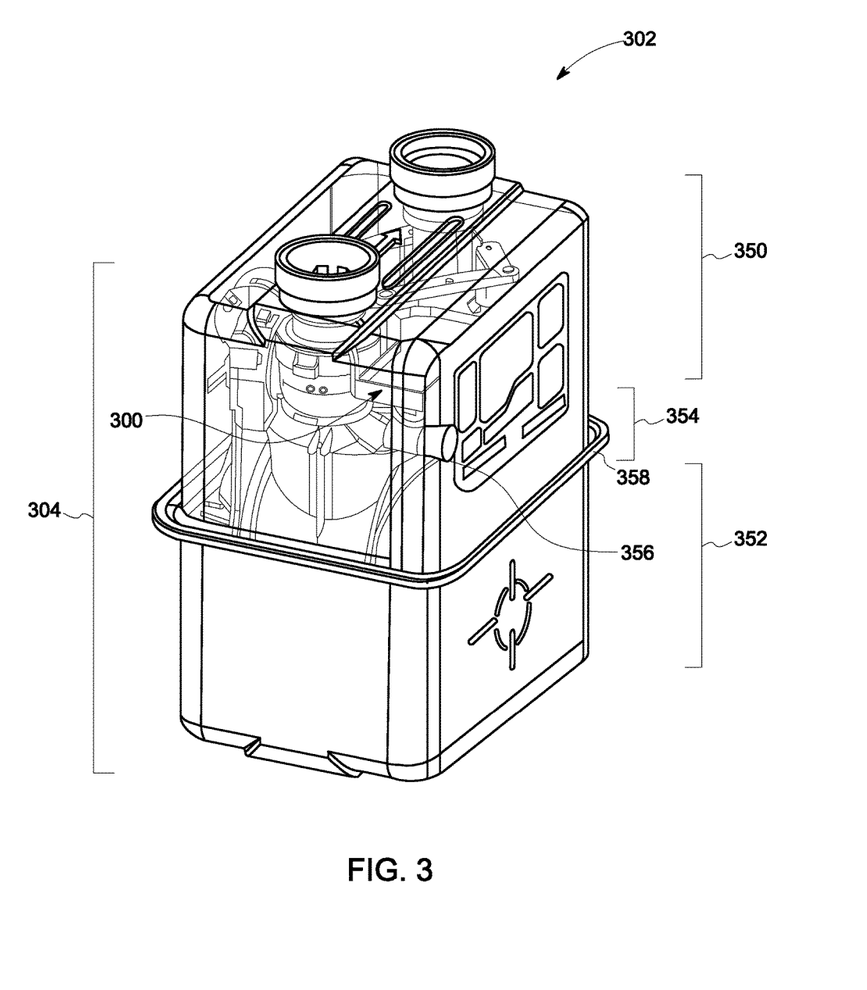
FIG. 3 depicts a perspective view of an exemplary embodiment of an encoder device as found in an example of a fluid meter, namely, in a metrological part having phantom lines to show the interior of the fluid meter.
Figure 4:
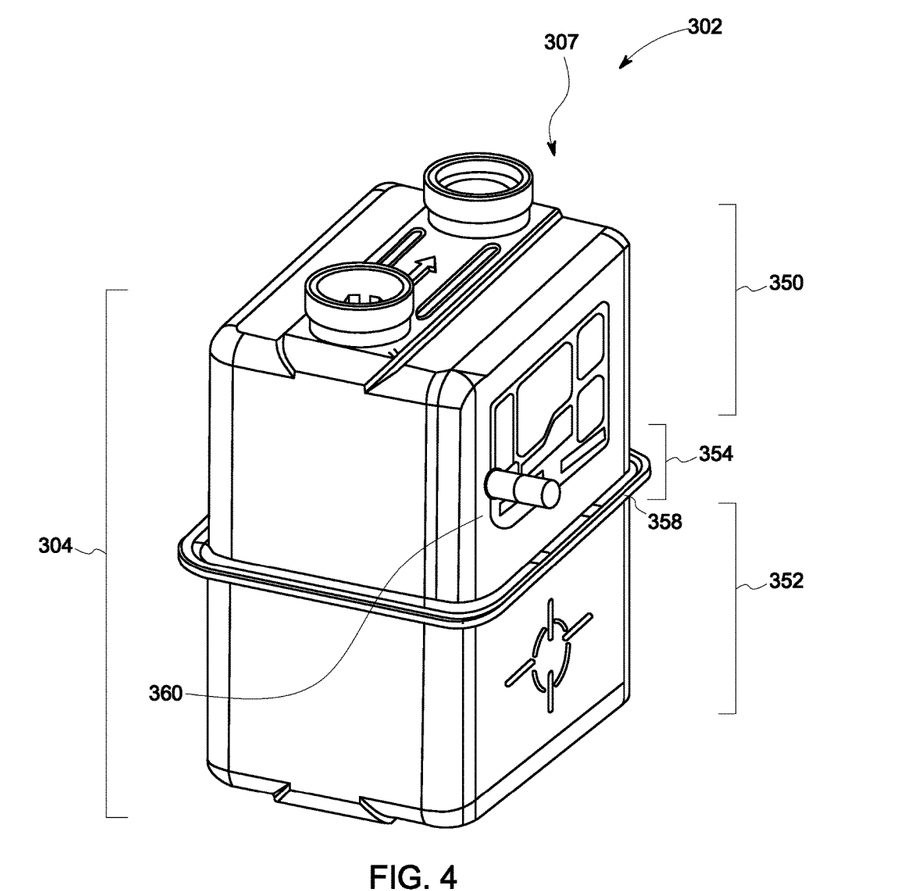
FIG. 4 depicts the fluid meter of FIG. 3 with phantom lines removed to illustrate the metrological part.
Figure 5:
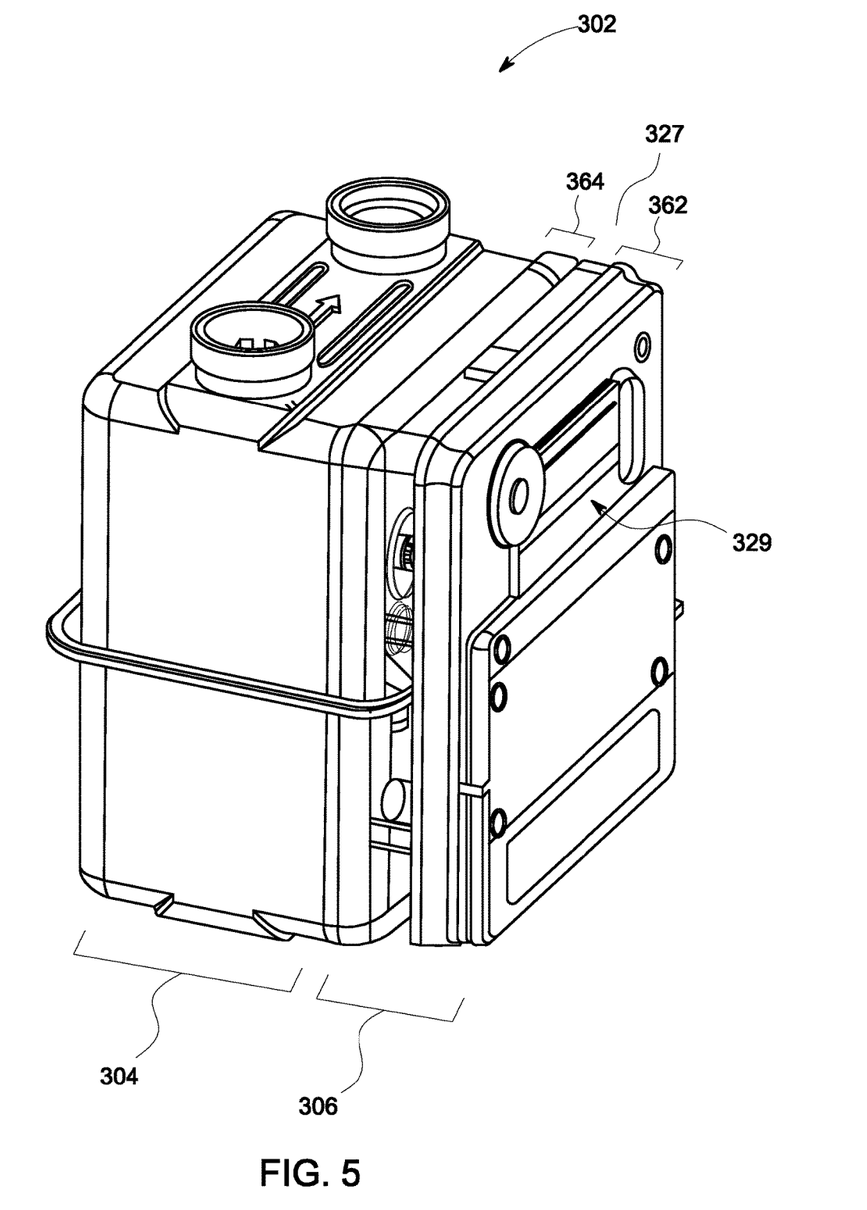
FIG. 5 depicts the fluid meter of FIG. 3 that includes an application part coupled with the metrological part.

FIGS. 3, 4, and 5 depict a diagram of an exemplary embodiment of an encoder device 300 that is configured to measure supply of gas to a consumer. These diagrams offer a perspective view of a fluid meter 302 with parts removed and/or shown in phantom lines for clarity. FIG. 3, for example, shows only the metrological part 304. In one embodiment, the first housing 307 has a first structure that forms a first interior space (also, "first interior volume") that receives the encoder device 300 along with the components of a monitoring system (e.g., monitoring system 118 of FIG. 1). This first structure can include one or more housing members (e.g., a first housing member 350 and a second housing member 352) that couple with one another at a joint 354 (also "interface 354"). The first structure can also include an opening 356, shown here as part of the first housing member 350. The opening 356 is configured to provide access to the first interior space of the first housing 307. In one example, the first structure also has a seal member 358 that circumscribes the joint 354. Examples of the seal member 358 include devices that seal the joint 354, thus preventing ingress (and egress) of materials into the first interior space as well as to maintain the integrity of the structure of the housing 307. As best shown in FIG. 4, the opening 356 can receive a connector member 360 that is configured to couple with the encoder 300 (FIG. 3).

FIG. 5 shows the fluid meter 302 with both the metrological part 304 and the application part 306 in position relative to the metrological part 304. Here, the second housing 327 includes a second structure that forms a second interior space (also, "second interior volume"). In certain configurations, the second structure uses at least one wall of the first structure to bound the second interior space. The second interior space can receive and/or support the various components of the application part 306. In one example, the second structure can include one or more cover members (e.g., a first cover member 362 and second cover member 364). The first cover member 362 can be configured to provide visual access to the display member 328. In one construction, the cover members 362, 364 can be configured to allow access to the second interior space. This construction may, for example, utilize joints (e.g., hinges, fasteners, etc.) that secure the first cover member 362 with the second cover member 364, but that allow an end user to remove, or displace, the first cover member 362 from the second cover member 364 to allow access, e.g., to the connector member 360.

Figure 6:
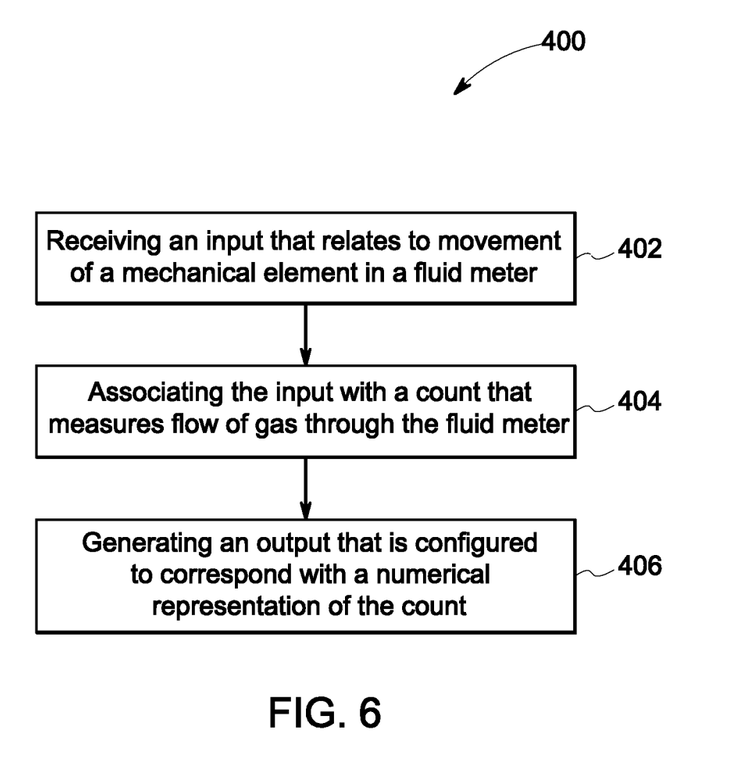
FIG. 6 is a flow diagram illustrating an exemplary method of operation of at least one embodiment of the encoder device described herein.

FIG. 6 provides a flow diagram of an exemplary method 400 that illustrates operation of an encoder device (e.g., encoder devices 100, 200, 300 of FIGS. 1, 2, and 3). The method 400 includes, at step 402, receiving an input that relates to movement of a mechanical element in a fluid meter. The method 400 also includes, at step 404, associating the input with a count that measures flow of gas through the fluid meter. The method 400 further includes, at step 406, generating an output that is configured to correspond with a numerical representation of the count.

The aspects of the foregoing discussion may be incorporated as elements and features in embodiments, one or more of the elements and features being interchangeable and/or combinable in various combinations, examples of which may include:

A1. A fluid meter (102) comprising a metering device (112) configured with a moveable element that moves in response to flow of fluid; an encoder device (100) coupled with the metering device (112), the encoder device (100) configured to generate an output that associates the movement of the moveable element with a volume of fluid that flows through the metering device (112); a first housing (107) enclosing the metering device (112) and the encoder device (100); and an input/output member (126) coupled with the first housing (107), the input/output member (126) configured to receive the output from the encoder device (100).

A2. The fluid meter (102) of claim A1, wherein the first housing (107) comprises an opening to receive the input/output member (126), and wherein the input/output member (126) is configured to seal the opening to prevent flow of fluid out of the housing (107) via the opening.

A3. The fluid meter (102) of claim A2, wherein the input/output member (126) comprises a connector with a first connective end and a second connective end disposed, respectively, inside a first interior space of the first housing (107) and outside of the first housing (107), and wherein the connector is configured to conduct the output from the first connective end to the second connective end.

A4. The fluid meter (102) of claim A3, further comprising a second housing (127) that couples with the first housing (107), wherein the second connective end is disposed inside of a second interior space of the second housing (127).

A5. The fluid meter (102) of claim A1, further comprising an interface member (122) coupled with the metering device (112) and with the encoder device (100), the interface member (122) configured to convert the movement of the moveable element to a signal with properties that relates the mechanical movement of the moveable element with the volume of fluid that flows through the metering device (112).

A6. The fluid meter (102) of claim A5, wherein the encoder device (100) incorporates the interface member (122).

A7. The fluid meter (102) of claim A1, wherein the encoder device (100) is configured to store data that relates to the volume of fluid that flows through the metering device (112).

A8. The fluid meter (102) of claim A1, wherein the encoder device (100) is wholly enclosed in the first housing (107).

A9. The fluid meter (102) of claim A1, further a sensor member coupled with the encoder device, wherein the sensor member is configured to generate a signal that reflects one or more operating conditions in the first housing (107).

A10. The fluid meter (102) of claim A9, wherein the output from the encoder device (100) associates the volume of fluid that flows through the metering device (112) with the operating condition.

A11. The fluid meter (102) of claim A10, wherein the sensor member is sensitive to temperature.

B1. A fluid meter (102) comprising a first housing (107) forming a first interior space; a monitoring system (118) disposed in the first interior space, the monitoring system (118) configured to generate a first signal with information that associates movement of a moveable element with a volume of fluid that causes the movement and to generate a second signal, in response to the first signal, with information that quantifies the supply of gas that flows through monitoring system (118); and an input/output member (126) coupled with the monitoring system (118), the input/output member configured to conduct the second signal from inside of the first interior space to outside of the first housing (107).

B2. The fluid meter (102) of B1, further comprising a second housing (127) coupled with the first housing (107), the second housing (127) forming a second interior space with at least one wall of the first housing (107), wherein the second housing (127) has a cover member that is configured to move relative to the first housing (107) to allow access to input/output member (126) in the second interior space.

B3. The fluid meter (102) of B2, wherein the monitoring system (118) comprises an encoder device (100) with a processor having access to memory, the processor configured to execute executable instructions that configure the encoder device (100) to receive the first signal and to generate the second signal.

B4. The fluid meter (102) of B4, wherein the encoder device (100) is wholly enclosed in the first housing (107).

B5. The fluid meter (102) of B4, further comprising a temperature sensor coupled with the encoder device (100), wherein the executable instructions configure the encoder device (100) to reflect, in the second signal, changes in the supply of gas that flows through the monitoring system (118) due to changes in temperature.

B6. The fluid meter (102) of B4, wherein the executable instructions configure the encoder device (100) to adjust the information in the second signal that quantifies the supply of gas using one or more calibration parameters.

C1. A metrological part (104) that measures a supply of gas that flows through a gas meter (102), said metrological part (104) comprising a housing (107) forming a first interior space; an encoder device (100) wholly disposed within the interior space, the encoder device (100) configured to generate a signal with information that quantifies the supply of gas; and an input/output member (126) coupled with the encoder device (100), the input/output member (126) configured to conduct the signal from inside of the first interior space to outside of the first housing.

C2. The metrological part (104) of C1, wherein the executable instructions configure the encoder device (100) to adjust the information in the signal that quantifies the supply of gas using one or more calibration parameters.

C3. The metrological part (104) of C1, wherein the input/output member (126) comprises a connector that penetrates the housing (107), wherein the connector has a first connective end disposed inside of the interior space and a second connective end disposed outside of the housing (107), and wherein the connector is configured to maintain a seal that prevents flow of gas through the housing (107).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid meter, comprising:
   a metering device configured with a moveable element that moves in response to flow of fluid;
   an encoder device coupled with the metering device, the encoder device configured to generate an output that associates the movement of the moveable element with a volume of fluid that flows through the metering device;
   an input/output member configured to receive the output from the encoder device; and a sensor member coupled with the encoder device, wherein the sensor member is configured to generate a signal that reflects one or more environmental operating conditions, and wherein the output generated by the encoder device provides information on an influence of the environmental operating conditions on operation of the fluid meter.

2. The fluid meter of claim 1, wherein the first housing comprises an opening to receive the input/output member.

3. The fluid meter of claim 2, wherein the input/output member comprises a connector with a first connective end and a second connective end disposed, respectively, inside a first interior space of the first housing and outside of the first housing, and wherein the connector is configured to conduct the output from the first connective end to the second connective end.

4. The fluid meter of claim 3, further comprising a second housing that couples with the first housing, wherein the second connective end is disposed inside of a second interior space of the second housing.

5. The fluid meter of claim 1, wherein the encoder device further comprises an interface member coupled with the metering device, the interface member configured to convert the movement of the moveable element to a signal with properties that relates the mechanical movement of the moveable element with the volume of fluid that flows through the metering device.

6. The fluid meter of claim 5, wherein the encoder device incorporates the interface member.

7. The fluid meter of claim 1, wherein the encoder device is configured to store data that relates to the volume of fluid that flows through the metering device.

8. The fluid meter of claim 1, wherein the encoder device is wholly enclosed in the first housing.

9. The fluid meter of claim 1, wherein the output from the encoder device associates the volume of fluid that flows through the metering device with the operating condition.

10. The fluid meter of claim 9, wherein the sensor member is sensitive to temperature.

11. A fluid meter, comprising:
a metering device;
an encoder device coupled with the metering device;
a first housing enclosing the metering device and the encoder device;
an input/output member coupled with the first housing; and
a sensor member coupled with the encoder device, wherein the sensor member is configured to generate a signal that reflects one or more environmental operating conditions in the first housing, and wherein the output generated by the encoder device provides information on an influence of the environmental operating conditions on operation of the fluid meter.

12. The fluid meter of claim 11, wherein the first housing comprises an opening to receive the input/output member.

13. The fluid meter of claim 12, wherein the input/output member comprises a connector with a first connective end and a second connective end disposed, respectively, inside a first interior space of the first housing and outside of the first housing, and wherein the connector is configured to conduct the output from the first connective end to the second connective end.

14. The fluid meter of claim 13, further comprising a second housing that couples with the first housing, wherein the second connective end is disposed inside of a second interior space of the second housing.

15. The fluid meter of claim 11, wherein the encoder device further comprises an interface member coupled with the metering device, the interface member configured to convert the movement of the moveable element to a signal with properties that relates the mechanical movement of the moveable element with the volume of fluid that flows through the metering device.

16. The fluid meter of claim 15, wherein the encoder device incorporates the interface member.

17. The fluid meter of claim 11, wherein the encoder device is configured to store data that relates to the volume of fluid that flows through the metering device.

18. The fluid meter of claim 11, wherein the encoder device is wholly enclosed in the first housing.

* * * * *